United States Patent
Li et al.

(10) Patent No.: US 6,730,162 B1
(45) Date of Patent: May 4, 2004

(54) HYDRAULIC BINDER RESULTING FROM MIXING A SULFATE BINDER AND A BINDER COMPRISING THE MINERAL COMPOUND $C_4A_3\bar{S}$

(76) Inventors: Guanshu Li, 16 rue des Suisses, 13200 Arles (FR); Hugues Hornain, 39 Avenue Victor Hugo, 13200 Arles (FR); Jean Couturier, 2340 chemin des Collines, 06110 Le Cannet (FR)

( * ) Notice: Subject to any disclaimer, the term of this patent is extended or adjusted under 35 U.S.C. 154(b) by 0 days.

(21) Appl. No.: 09/592,770

(22) Filed: Jun. 13, 2000

(30) Foreign Application Priority Data

Apr. 5, 2000 (FR) .............................. 00 04524

(51) Int. Cl.$^7$ .................. C04B 11/00; C04B 11/06; C04B 11/28
(52) U.S. Cl. .................. 106/772; 106/695; 106/775
(58) Field of Search ................. 106/695, 772, 106/775

(56) References Cited

U.S. PATENT DOCUMENTS

| | | | | |
|---|---|---|---|---|
| 3,860,433 A | * | 1/1975 | Ost et al. | 106/89 |
| 4,957,556 A | * | 9/1990 | Kunbargi | 106/693 |
| 6,113,684 A | * | 9/2000 | Kunbargi | 106/692 |
| 6,197,107 B1 | * | 3/2001 | Stav et al. | |

FOREIGN PATENT DOCUMENTS

| | | |
|---|---|---|
| FR | 2 767 816 | 3/1998 |
| JP | 58190849 A | * 11/1982 |
| WO | WO 94/29232 | 12/1994 |

OTHER PUBLICATIONS

Preliminary Search Report dated Jan. 19, 2001.
Database WPI dated Feb. 18, 1997, 1 pg.
Chemical Abstract, vol. 100, No. 14, dated Apr. 12, 1984, 1 pg.
*GYPCEMENT: a new high performance/low cost binder*, Innovation Relay Centre, XP–002156350, extracted Dec. 28, 2000, 1 pg.

* cited by examiner

*Primary Examiner*—Elizabeth D. Wood
(74) *Attorney, Agent, or Firm*—Cohen, Pontani, Lieberman & Pavane

(57) ABSTRACT

The present invention relates to a method of preparing a hydraulic binder wherein at least the following two binders are mixed together:

a) a first hydraulic binder having as one of its main components the mineral compound $C_4A_3\bar{S}$; and b) a sulfate second binder based on calcium sulfate hemihydrate and/or anhydrite obtained by applying heat treatment to gypsum.

The present invention also provides a binder comprising amongst its main components:

a) a mineral compound $C_4A_3\bar{S}$; and b) a compound comprising a hemihydrate of calcium sulfate of α or β form and of general formula $CaSO_4$, $\tfrac{1}{2}H_2O$ and/or an anhydrite of III form of general formula $CaSO_4$, $\epsilon H_2O$ with $\epsilon$ lying in the range 0 to 0.5, preferably in the range 0.06 to 0.11, or an anhydrite of II form of formula $CaSO_4$.

11 Claims, No Drawings

HYDRAULIC BINDER RESULTING FROM MIXING A SULFATE BINDER AND A BINDER COMPRISING THE MINERAL COMPOUND $C_4A_3\bar{S}$ The present invention relates to a new hydraulic binder resulting from mixing a binder of the cement or clinker type with a sulfate binder of the plaster or improved plaster type as obtained by applying heat treatment to gypsum, including Gypcement®.

BACKGROUND OF THE INVENTION

Traditional plaster is obtained by partially dehydrating gypsum ($CaSO_4$, $2H_2O$) into a hemihydrate or bassanite ($CaSO_4$, $½H_2O$) of β crystal form. In order to be used as a coating the hemihydrate powder must be rehydrated.

Further dehydration of gypsum leads to the hemihydrate being transformed into artificial anhydrites, specifically III or α anhydrite also known as soluble anhydrite, and then II or β anhydrite also known as insoluble or dead-burned anhydrite. III or α anhydrite can be represented by the formula ($CaSO_4$, $\epsilon H_2O$) where $\epsilon$ lies in the range 0 to 0.5, and in particular the range 0.06 to 0.11. III or α anhydrite is a metastable phase that is extremely hygroscopic and thus rehydrates very rapidly. It rehydrates spontaneously into hemihydrate as a function of the humidity of the air. 100% III or α anhydrite is thus never obtained, since it is always associated with bassanite (hemihydrate).

β plasters are obtained by firing gypsum at a temperature below 200° C. at atmospheric pressure. They are constituted by β-$CaSO_4$, $½H_2O$ hemihydrates which, in ordinary plasters, can be accompanied by soluble anhydrite $CaSO_4$, $\epsilon H_2O$ and dead-burned $CaSO_4$ in very small quantities.

Improved plasters (sometimes known as "α plasters") can be prepared which, once they have set, present mechanical characteristics that are better than those of ordinary plasters. The phenomena which occur during treatments are poorly understood and the improvement in mechanical performance is generally attributed to the presence of the α variety of crystal in the resulting products, without it being known exactly what proportion said variety occupies in such products nor what conditions enable it to be obtained in stable and reproducible manner.

Traditionally, such α plasters are made from gypsum by subjecting it to a firing stage at a temperature below 200° C. using a wet method in an autoclave under a pressure of about 5 bars to 10 bars for a duration of about 10 hours, and then subjecting it to a hot drying stage using a flow of hot dry air.

Other methods have been proposed in attempts to mitigate the defects of that traditional method of making improved plaster (extremely expensive to implement, poor reproducibility).

Heat treatment methods are known that serve to obtain stabilized III or α anhydrite so as to limit its spontaneous rehydration, which methods essentially comprise the following two steps:

a) Firstly a step of drying and dehydrating the gypsum by increasing its temperature to form III or a anhydrite. This dehydration should enable the surface moisture of the gypsum to be dried off and should eliminate the two molecules of crystallization water.

b) Subsequently, a step of temperature quenching to stabilize the metastable phase.

Stabilized III anhydrite makes it possible to obtain materials having properties that are most advantageous, such as high mechanical strength, in particular high early mechanical strength, and properties of thermal and acoustic insulation that can be better than those of plaster or cement. Furthermore, III anhydrite can be obtained at costs that are lower than the costs of obtaining plaster or cement.

The stabilized III or α anhydrite content is a function of the heat treatment method: temperature, firing time, and initial gypsum grain size are the key factors.

WO 96/33957 discloses a method of applying heat treatment to a powder material based on dihydrated calcium sulfate in which a firing step is performed to raise the temperature of the treated gypsum to a temperature lying in the range 220° C. to 360° C., depending on the characteristics of the gypsum being treated, and an operation of temperature quenching implemented so as to bring the material heated by the firing to a temperature below 100° C. in a period of time lying in the range 6 minutes (min) to 12 min. This cooling is performed by means of cold dry air injected under pressure into the core of the material. The method enables the dihydrate to be transformed into as much as 70% stabilized III or α anhydrite.

In French patent application FR 2 767 816, a method is described that enables more than 70% of hydrated calcium sulfate to be transformed into stable III or a anhydrite in which the temperature quenching is performed more quickly by lowering the temperature to below 80° C., and preferably to a temperature in the range 40° C. to 50° C. in less than 2 minutes in order to stabilize a larger fraction of the III or α anhydrite. That method makes it possible to obtain a product containing more than 70% or even more than 90% stabilized III or α anhydrite relative to the total weight of the compounds obtained after transforming the hydrated calcium sulfate contained in the starting material.

In French patent application FR 00/01335, the Applicant describes a method which enables stabilized III or α anhydrite to be supplied on an industrial scale with purity of at least 85%, but capable of reaching 90% or even 95% or more relative to the total weight of compounds derived from transforming the hydrated calcium sulfate in the starting material.

That method of industrially producing stabilized III or α anhydrite by applying heat treatment to a powder material based on hydrated calcium sulfate ($CaSO_4$, $2H_2O$), preferably natural or synthetic gypsum, comprises successive steps in which:

a) said powder material is heated to a temperature lying in the range 220° C. to 360° C. so as to transform the hydrated calcium sulfate into soluble III or α anhydrite; and b) said material transformed in that way is subjected to temperature quenching so as to lower its temperature by at least 150° C. so as to reach a temperature that at worst is below 110° C., and preferably is below 80° C., and to do so preferably in less than 2 minutes, so as to stabilize the III or α anhydrite.

During firing step a), the calcium sulfate dihydrate loses surface water and 26.2% crystallization water. In that method, ambient moisture in contact with the material and transformed into III or α anhydrite in step a) is removed, in particular the moisture given off by said material heated in step a), with this removal taking place before and during cooling step b). More particularly, in said method, the moisture is removed by sucking out the moist ambient atmosphere in contact with said transformed material. In an advantageous implementation, steps a) and b) are performed in different reactors and the moist atmosphere of step a) is removed by suction means situated upstream from the reactor for step b). Advantageously, a flow of dry gas is applied to said material transformed in step a) as a counterflow relative to the travel of said material between step a) and step b), said gas being preferably dry air. Thus, the material dehydrated in step a) does not run the risk of rehydrating before step b) has been performed. Also advantageously, a flow of cold and dry gas is applied to said transformed material as a counterflow relative to the travel of said material while step b) is taking place. Preferably, said counterflow of dry gas is removed together with the moist atmosphere of step a). This prevents the hot moist air given off in step a) being returned upstream from the reactor for step a) where it would come into contact with said material before it reaches the required temperature, which would have the effect of increasing the moisture content of said material and decreasing the efficiency of step n).

The dry air is injected at a pressure that is determined so that the travel of the gypsum towards the outlet from the reactor is not impeded by the air.

In a preferred implementation of the method, prior to step a), the surface moisture of the gypsum is reduced to a weight percentage of less than 10% and preferably less than 5%. Said moisture is preferably removed so that the moisture content in the ambient air is less than 1% by weight.

Also preferably, said starting powder material comprises at least 95% by weight, preferably at least 98% by weight, of calcium sulfate dihydrate ($CaSO_4$, $2H_2O$)

The Applicant sells binders based on soluble III or $\alpha$ anhydrite under the trademark Gypcement®, which binders are manufactured using the specific methods described above of treating natural gypsum or synthetic gypsum associated with various industrial processes (sulfogypsums, phosphogypsums, desulfuration gypsums, etc. ...).

In the present application, hydraulic binders based on hemihydrates and/or anhydrites obtained by dehydration heat treatment applied to calcium sulfate dihydrate, and in particular to gypsum whether natural or synthetic, are referred to as "sulfate binders based on calcium sulfate obtained by applying heat treatment to gypsum".

The main drawback of such sulfate type hydraulic binders is that they set very quickly, which problem can be solved to a greater or lesser extent by using additives (retarders and plasticizers). By using a setting retarder agent or a thinning agent, it is not possible to achieve setting times greater than 4 hours without significantly degrading mechanical strength properties. Another drawback of such sulfate binders is their excessive sensitivity to humidity and their very low water content, which restricts them to indoor use.

The Portland cements traditionally used in building and public works have a setting time that is much longer, mechanical strength that is generally higher, and good behavior with respect to water.

Common artificial cement, known as artificial Portland cement (APC), is a mixture of calcium silicates and aluminates that result from combining lime (CaO) with silica ($SiO_2$), alumina ($Al_2O_3$), and iron oxide ($Fe_2O_3$) from raw materials constituted mainly by limestones, clays, or marls. Firing the finely ground and homogenized raw material mixture in a rotary kiln at about 1450° C. gives rise to a clinker which is essentially constituted by calcium silicates ($C_3S$ and $C_2S$) and tricalcium aluminate ($C_3A$) and tetracalcium aluminoferrite ($C_4AF$).

The clinker is converted into cement by grinding in the presence of gypsum (setting regulator), generally at a concentration of about 3%. The granules of clinker need to be reduced to the state of a fine powder.

Compared with sulfate binders, Portland cements are characterized by an extremely high investment cost, by setting and hardening that are much slower, and generally require at least 6 hours, by good behavior in water but sometimes poor resistance to chemical attack (acids, salts such as sulfates, ...) which is a function of their chemical and mineral composition ($C_3A$ content, presence or absence of mineral additions, ...). furthermore, such cements are sensitive to shrinking and their traction strength is rather weak.

A drawback of such conventional cements is their sensitivity to sulfate-containing waters which tend to degrade their structure, and another drawback is their tendency to cracking which is associated with relatively low traction strength Rt and to a phenomenon of shrinking on drying.

Furthermore, in the building industry, it is important to obtain initial mechanical strength, particularly strength at 7 days, that is high enough to support loads and to enable shuttering to be removed quickly, thus making it necessary with Portland cement to use large quantities of cement.

In some cases, high-alumina cements, sulfoalumina cements (CSA), or ferroalumina cements (FAC) can constitute advantageous alternatives to Portland cements.

High-alumina cement is manufactured by fusing bauxite and limestone, and is also known as "Ciment Fondu". It is essentially constituted by monocalcium aluminate which enables it, in 24 hours, to reach strengths that a Portland cement will reach only in 28 days. It also has refractory properties.

Sulfoalumina and ferroalumina cements are the result of grinding the corresponding clinker in the presence of natural anhydrite $CaSO_4$ and/or of natural gypsum $CaSO_4$, $2H_2O$. The clinker is obtained by firing a suitable mixture at about 1350° C. Its main components are as follows: an anhydrous calcium sulfoaluminate of formula $4CaO$, $3Al_2O_3$, $CaSO_4$ ($C_4A_3\bar{S}$=55%–75%), bicalcium silicate $2CaO$, $SiO_2$ ($C_2S$=15%–30%), and calcium aluminoferrite of the $4CaO$, $Al_2O_3$, $Fe_2O_3$ type ($C_4AF$=10%–30%).

The chemical and mineral compositions in percentages by weight are compared in the following tables for: sulfoalumina cements (SAC), ferroalumina cements (FAC), and high-alumina cements.

|  | Portland cement | SAC | FAC | High-alumina |
|---|---|---|---|---|
| Chemical composition |  |  |  |  |
| $Al_2O_3$ | 3–6 | 28–40 | 25–30 | 40–50 |
| $SiO_2$ | 19–23 | 3–10 | 6–12 | <0.2 |
| CaO | 61–65 | 36–43 | 43–36 | 37–39 |
| $Fe_2O_3$ | 2–5 | 1–3 | 5–12 | 15–18 |
| $SO_3$ | 2–4 | 8–15 | 5–10 | <0.1 |
| Mineral compesition |  |  |  |  |
| $C_4A_3\bar{S}^{(1)}$ | — | 55–75 | 35–55 | — |
| $C_2S^{(2)}$ | 10–30 | 15–30 | 15–35 | — |
| $C_3S^{(3)}$ | 40–70 | — | — | — |
| $C_3A^{(4)}$ | 1–15 | — | — | — |
| $C_4AF^{(5)}$ | 5–15 | 3–6 | 15–30 | — |
| Calcium sulfate$^{(6)}$ | 2–8 | 10–20 | 10–20 | — |
| CA | — | — | — | 40–50 |
| Ferrites ($C_2F$) | — | — | — | 20–40 |
| Others ($C_2S$, $C_2AS$, $Cl_2A_7$, $TIO_2$ ...) | — | — | — | 5–10 |

Note: C = CaO; S = $SiO_2$; A = $Al_2O_3$; F = $Fe_2O_3$; $\bar{S}$ = $SO_3$
(1)calcium sulfoaluminate of formula $4CaO$, $3Al_2O_3$, $CaSO_4$.
(2)bicalcium silicate: $2CaO$, $SiO_2$.
(3)tricalcium silicate: $3CaO$, $SiO_2$.
(4)tricalcium aluminate: $3CaO$, $Al_2O_3$.
(5)calcium aluminoferrite: $4CaO$, $Al_2O_3$, $Fe_2O_3$.
(6)gypsum, natural anhydrite.

Conservative characteristics concerning setting, hardening, and durability of these cements can be summarized as follows:

Portland cements: setting relatively slow ($\geq$6h), initial strength weak, develops strength under water, durability and in particular resistance to sulfates sometimes poor.

High-alumina cements: fast setting, high initial strength, durability, in particular higher resistance to sulfates, but stability associated with hydrate conversion can sometimes be problematic and cost is very high.

Sulfoalumina or ferroalumina cements (SAC or FAC); setting quite fast, initial strength quite high, develops strength under water, durable, and in particular high resistance to sulfates.

Attempts have been made over a long period of time to combine cements and plasters so as to provide a new hydraulic binder that combines or at least modulates the various respective characteristics and advantages of these two types of hydraulic binder. These experiments have never succeeded, essentially because of the chemical incompatibility between these components (Marc Nolhier, "Construire en plâtre" [Building with plaster], published by Harmattan 1986, pp. 160–161). The appearance of ettringite is observed which gives rise to swelling that affects mechanical properties, in particular with problems of cracking and also chemical reactions which damage metal reinforcement in concrete.

OBJECTS AND SUGARY OF THE INVENTION

The object of the present invention is to provide novel hydraulic binders enabling the respective advantages of sulfate binders and cements to be combined while correcting their weaknesses in certain areas: more particularly setting and hardening speeds, strength when very young, durability, behavior in water.

More particularly, an object of the present invention is to provide a novel binder enabling the initial mechanical strength in compression of known cement type or sulfate type (plaster) hydraulic binders to be increased.

The inventors have discovered that sulfate hydraulic binders can be mixed with some categories of cement to confer original properties thereto.

More precisely, the present invention provides a method of preparing a hydraulic binder wherein at least the following two binders are mixed together:

a) a first hydraulic binder having as one of its main components the mineral compound $C_4A_3\bar{S}$ and b) a sulfate second binder based on calcium sulfate hemihydrate and/or anhydrite obtained by applying heat treatment to gypsum.

The term "one of the main components" of said first binder means that the first binder hags at least 10% by weight of said component.

Preferably, said first hydraulic binder has as its majority component the mineral compound $C_4A_3\bar{S}$.

Cements having the mineral compound $C_4A_3\bar{S}$ as one of their main compounds include SAC/FAC cements having $C_4A_3\bar{S}$ as a majority component, and also cements made of bellite having $C_4A_3\bar{S}$ as a secondary component (cements made of 50%–70% $C_2S$ and 20%–40% $C_4A_3\bar{S}$ with added gypsum).

Other cements having $C_4A_3\bar{S}$ as one of their main components are described by Su Muzhen, W. Kursowski, and Sorrentino in "Development in non-Portland cements 9th International Congress on the chemistry of cement", New Delhi, 1992, pp, 317–354.

More particularly, said first binder is a sulfoalumina or a ferroalumina clinker or cement, comprising as its main mineral components: $C_4A_3\bar{S}$, $C_2S$, and $C_4AF$, and for the cement, calcium sulfates in the form of natural anhydrite $CaSO_4$ or gypsum $CaSO_4, 2H_2O$.

Similarly, more particularly, said sulfate binder comprises as its main component a compound selected from calcium sulfate hemihydrates of α or β form, having the general formula $CaSO_4, \tfrac{1}{2}H_2O$; and anhydrites of soluble III form of formula $CaSO_4, \epsilon H_2O$ where $\epsilon$ lies in the range 0 to 0.5, preferably in the range 0.06 to 0.11, or of the II form of formula $CaSO_4$ or a mixture of said hemihydrates and anhydrites.

Preferably, said sulfate binder comprises a mixture of soluble III anhydrite and α or β form hemihydrate, more preferably the β form.

When the sulfate binder is a Gypcement®, said sulfate binder is a binder comprising more than 50%, and preferably 70% soluble III anhydrite.

When said sulfate binder is an α or β plaster, said sulfate binder is a binder comprising more than 50% α or β form hemihydrate.

In a first implementation, the content by weight of said sulfate binder in said mixture, relative to the content of said first binder, is less than or equal to 50/50.

In a second implementation, the content by weight of said sulfate binder relative to the content of said first binder is greater than 50/50 in said mixture.

Binders comprising clinker or sulfoalumina/ferroalumina cement (SAC or FAC) and soluble anhydrite and/or hemihydrate enable the properties of SAC or FAC cements to be improved providing the quantity of soluble anhydrite and/or hemihydrate is less than or equal to 50%, and substances based on hemihydrate (α or β plasters) or on anhydrite if the quantity of SAC or FAC cement or clinker is equal to or less than 50%. In general, the composite binders of the invention give rise to the following main characteristics:

fast setting and hardening, which can easily be modulated between a few minutes and a few hours;

high initial strength;

improved strength for SAC or FAC cement at some concentrations;

improved strength and behavior in water for all products based on soluble anhydrite or hemihydrate, plasters, and Gypcement®;

higher strength in water than in air at some concentrations, higher strength in air than in water for other concentrations; there is an optimum concentration around 50/50 at which strength develops in air and in water in equivalent manner and is better than that of SAC or FAC cements on their own or than that of products based on soluble anhydrite or hemihydrate on their own; and improved durability, in particular improved resistance to sulfates.

More particularly, in an implementation, the weight ratio of said sulfate binder to said first binder lies in the range 5/95 to 50/50, more particularly in the range 5/95 to 20/80.

More particularly, in another implementation, the weight ratio of said sulfate binder to said first binder lies in the range 50/50 to 95/5, more particularly in the range 80/20 to 95/5.

In general, ratios lying in the range 5/95 to 20/80 are more advantageous than those lying in the range 20/80 to 50/50 for improving clinker or SAC/FAC cement, and ratios lying in the range 80/20 to 95/5 are more advantageous than those in the range 50/50 to 80/20 for improving plasters or products based on plaster and/or III anhydrite.

Advantageously, in the method of the invention, the natural gypsum or natural anhydrite of said first binder is replaced in full or in part by said second binder.

More particularly, the natural gypsum and/or natural anhydrite in cements having as one of its main components the mineral compound $C_4A_3\bar{S}$ is replaced in part or in full by $\beta CaSO_4, \tfrac{1}{2}H_2O$ plaster or $\alpha CaSO_4, \tfrac{1}{2}H_2O$ plaster or a product based on III soluble anhydrite including Gypcement® or a product based on dead-burned II anhydrite, or a product having as a main component one or more of the above-mentioned varieties of calcium sulfate.

The present invention thus also provides a hydraulic binder that can be obtained by the method of the invention, in particular a binder comprising amongst its main components:

a) a mineral compound $C_4A_3\overline{S}$; and
b) a compound comprising a hemihydrate of calcium sulfate of α or β form and of general formula $CaSO_4$, ½$H_2O$ and/or an anhydrite of III form of general formula $CaSO_4$, $\epsilon H_2O$ with $\epsilon$ lying in the range 0 to 0.5, preferably in the range 0.06 to 0.11, or an anhydrite of II form of formula $CaSO_4$.

The term "main components" of said hydraulic binder is used herein to designate a total content by weight of said components in said hydraulic binder of not less than 5%, preferably of at least 10%, and more preferably of at least 20%.

More particularly, said hydraulic binder comprises at least:

a) 2.5% to 95% by weight of said compound $C_4A_3\overline{S}$; and
b) 2.5% to 95% of said hemihydrate and/or anhydrite, preferably in III form.

For mixtures comprising less than 50% sulfate binder, the hydraulic binder can comprise more particularly:

a) 15% to 75% by weight of said compound $C_4A_3\overline{S}$; and
b) 5% to 50% of said hemihydrate and/or said anhydrite of calcium sulfate, preferably of the III form.

For mixtures comprising more than 50% sulfate binder, the hydraulic binder can comprise more particularly:

a) 5% to 35% by weight of said compound $C_4A_3\overline{S}$; and
b) 25% to 95% of said hemihydrate and/or anhydrite of calcium sulfate, preferably of the III form.

In an embodiment, the hydraulic binder of the invention has a weight ratio of $C_4A_3\overline{S}$ to $C_2S$ of 1 to 5.

In an embodiment, the ratio by weight of said hemihydrate to said anhydrite of calcium sulfate is less than 30/70, preferably less than 15/85, more preferably less than 10/90.

The hydraulic binders for which the sulfate binder is a Gypcement® based on III anhydrite comprise more particularly:

a) 5% to 35% by weight of said compound $C_4A_3\overline{S}$; and
b) 25% to 95% by weight of soluble III anhydrite of calcium sulfate.

Or:
a) 15% to 75% by weight of $C_4A_3\overline{S}$; and
b) 5% to 50% by weight of soluble III anhydrite of calcium sulfate.

More particularly, the binder of the invention comprises mineral filler additives selected from slag, fly ash, pozzolan, silica soot, limestone fines, lime, industrial by-products, and wastes of organic or inorganic nature.

The present invention also provides materials made from a binder of the invention, preferably in the form of mortar, concrete, coating, or slip, in particular for manufacturing panels, bricks, breeze blocks, and screeds.

DETAILED DESCRIPTION OF THE INVENTION

Other characteristics and advantages of the present invention will appear on reading the following Examples 1 to 4.

Materials and Procedure

1) The binder Gypcement® used in Examples 1 to 4 was obtained from sulfogypsum having 3.5% impurities and grain size smaller than 100 μm. The temperature of the product leaving the oven was 240° C., and it was fired for 20 minutes. The temperature of the product leaving cooling was 20° C. and cooling took 2 minutes.

The resulting product comprised 80% stabilized III or α anhydrite, 5% impurities, and 15% hemihydrate.

2) The plaster used in Examples 1 to 4 was a β type industrial plaster (Lafarge Prestia Selecta).

3) The industrially manufactured sulfoalumina cement corresponded to the composition range given in the table above (55% to 75% of $C_4A_3\overline{S}$, 15% to 30% of $C_2S$, 3% to 6% of $C_4AF$, 10% to 20% natural anhydrite or gypsum).

4) In Examples 1 to 4, Rc=compression strength in MegaPascals (MPa) measured using standard EN-196.1 "Cement-testing method—Part 1: Determining mechanical strength".

EXAMPLE 1

Two binders comprising 80% sulfoalumina cement and 20% Gypcement® based on soluble anhydrite or 20% common plaster gave rise to the mechanical characteristics given in Table 1. Tests were performed using standard EN-196.1

TABLE 1

Mechanical strengths of mixtures comprising 80% SAC + 20% sulfate binder

|  | Reference SAC cement | 80% SAC + 20% Gypcement ® | 80% SAC + 20% plaster |
|---|---|---|---|
| Rc at 6 h In air: | 8.5 | 28.1 | 23.0 |
| Rc at 1 d | 31.0 | 42.2 | 39.9 |
| Rc at 7 d | 40.8 | 66.9 | 66.2 |
| Rc at 28 d In water: | 42.1 | 69.6 |  |
| Rc at 1 d | 43.5 | 43.4 | 43.1 |
| Rc at 7 d | 53.9 | 73.4 | 68.8 |
| Rc at 28 d | 55.4 | 79.5 | 80.4 |
| Rc at 90 d | 59.3 | 88.9 |  |

EXAMPLE 2

Two binders comprising 60% sulfoalumina cement and 40% Gypcement® based on soluble anhydrite or 40% common plaster gave rise to the mechanical characteristics given in Table 2. Testing was performed using standard EN-196.1

TABLE 2

Mechanical strengths of mixtures comprising 60% SAC + 40% sulfate binder

|  | Reference SAC cement | 60% SAC + 40% Gypcement ® | 60% SAC + 40% plaster | Reference Gypcement ® |
|---|---|---|---|---|
| Rc at 6 h In air: | 8.5 | 27.6 | 23.6 | 17.5 |
| Rc at 1 d | 31.0 | 39.5 | 39.4 | 17.0 |
| Rc at 7 d | 40.8 | 57.8 | 59.3 | 25.3 |
| Rc at 28 d In water: | 42.1 |  |  | 29.6 |
| Rc at 1 d | 43.5 | 35.2 | 34.6 | 12.6 |
| Rc at 7 d | 53.9 | 42.0 | 41.5 | 11.3 |

TABLE 2-continued

Mechanical strengths of mixtures comprising 60%
SAC + 40% sulfate binder

|  | Reference SAC cement | 60% SAC + 40% Gypcement ® | 60% SAC + 40% plaster | Reference Gypcement ® |
|---|---|---|---|---|
| Rc at 28 d | 55.4 | 67.5 | 61.8 | Surface very dissolved |
| Rc at 90 d | 59.3 |  |  | Test piece dissolved |

EXAMPLE 3

A binder made up of 80% Gypcement® based on soluble anhydrite and 20% sulfoalumina cement gave rise to the mechanical characteristics given in Table 3. 0.05% retarder and 3% thinner were used during testing in accordance with standard EN-196.

TABLE 3

Mechanical strengths of mixtures of 80%
Gypcement ® + 20% SAC

|  | Reference Gypcement ® | 80% Gypcement ® + 20% SAC |
|---|---|---|
| Rc at 6 h | 17.5 | 22.5 |
| In air: |  |  |
| Rc at 1 d | 17.0 | 25.6 |
| Rc at 7 d | 5.4 | 35.5 |
| Rc at 28 d | 29.6 | 49.7 |
| In water: |  |  |
| Rc at 1 d | 12.6 | 17.5 |
| Rc at 7 d | 11.3 | 17.9 |
| Rc at 28 d | Surface very dissolved |  |
| Rc at 90 d | Test piece completely dissolved | 21.5 |

EXAMPLE 4

Two mixtures made up of 70% Gypcement® based on soluble anhydrite or 70% ordinary plaster and 30% sulfoalumina cement were used as the binder in mortars comprising 35% binder +65% EN 196-1 standardized sand and prepared under the following conditions:

dry mixing for 30 seconds;

water added over 30 seconds while maintaining slow mixing; and slow mixing for 90 seconds.

Two series of tests were performed:

1) the water/binder ratio was set at 0.7, with the consistency of the mortars being a function of the binder used; and
2) the consistency of the mortars with SAC cement was adjusted to match the references.

The mechanical characteristics are given in Tables 4a and 4b, respectively.

TABLE 4a

Mechanical strengths of mixtures of 70%
Gypcement ® + 30% SAC (water/binder ratio = 0.7, variable mortar consistency)

|  | Reference Gypcement ® | 70% Gypcement ® + 30% SAC | Reference plaster | 70% plaster + 30% SAC |
|---|---|---|---|---|
| Consistency | Good | Very fluid | Good | Very fluid |
| Setting time | 25 min | 22 min | 68 min | 90 min |
| Rc at 6 h | 10.4 | 12.9 | 6.3 | 8.7 |
| In air: |  |  |  |  |
| Rc at 1 d | 11.3 | 16.3 | 6.3 | 11.5 |
| RC at 7 d | 19.7 | 23.0 | 14.2 | 19.2 |
| Rc at 28 d | 20.7 | 29.6 | 13.8 | 23.0 |
| In water: |  |  |  |  |
| Rc at 1 d | 9.4 | 11.2 | 5.7 | 7.7 |
| Rc at 7 d | 7.4 | 11.0 | 4.4 | 11.1 |
| Rc at 28 d | 4.5 | 15.6 | 2.4 | 12.8 |
| Rc at 90 d |  |  |  |  |

TABLE 4b

Mechanical strengths of mixtures of 70%
Gypcement ® + 30% SAC (mortars of equivalent consistency, variable water/binder ratio)

|  | Reference Gypcement ® | 70% Gypcement ® + 30% SAC | Reference plaster | 70% plaster + 30% SAC |
|---|---|---|---|---|
| Water/binder | 0.7 | 0.61 | 0.7 | 0.60 |
| Setting time | 25 min | 25 min | 68 min | 77 min |
| Rc at 6 h | 10.4 | 20.4 | 6.3 | 8.7 |
| In air: |  |  |  |  |
| Rc at 1 d | 11.3 | 24.9 | 6.3 | 11.5 |
| Rc at 7 d | 19.7 | 31.4 | 14.2 | 28.7 |
| Rc at 28 d | 20.7 | 41.5 | 13.8 | 34.9 |
| In water: |  |  |  |  |
| Rc at 1 d | 9.4 | 15.8 | 5.7 | 7.7 |
| Rc at 7 d | 7.4 | 13.4 | 4.4 | 16.7 |
| Rc at 28 d | 4.5 | 19.2 | 2.4 | 19.9 |
| RC at 90 d |  |  |  |  |

Analysis of the Results of Examples 1 to 4

In Examples 1 and 2, where the mixtures had less than 50% of Gypcement® or of plaster, there can be seen a very clear improvement of mechanical properties compared with a sulfoalumina cement on its own, both in terms of strength when very young, i.e. at 6 hours, and for long-term strength, demonstrating synergy compared with the starting materials which are cement on its own and Gypcement® or plaster on its own.

The improvement in the mechanical properties of Gypcement® observed in Examples 3 and 4 where Gypcement® is the majority component of the mixture likewise leads to highly advantageous products in which the high Gypcement® content confers not only a short setting time, but also good properties of thermal and acoustic insulation, and a cost that is lower than cement. Adding sulfoalumina or ferroalumina cement to Gypcement® gives Gypcement® good behavior under water.

Replacing some or all of the natural gypsum and/or the natural anhydrite in SAC or FAC cements with a $CaSO_4$, ½H$_2$O plaster or an a CaSO$_4$, ½H$_2$O plaster or with a product based on III soluble anhydrite including Gypcement® or a product based on dead-burned anhydrite, or a product having as its main component one or more of the above-mentioned varieties of calcium sulfate is therefore advantageous.

Similarly, adding clinker or SAC or FAC cement to plasters based on β CaSO$_4$, ½H$_2$O or a CaSO$_4$, ½H$_2$O plasters or to products based on soluble anhydrite, including Gypcement®, or to products based on dead-burned anhydrite, or to products having as their main component one or more of the above-mentioned varieties of calcium sulfate, is thus likewise advantageous.

What is claimed is:

1. A method of preparing a hydraulic binder, comprising the step of mixing two binders comprising:
   a) at least 50% by weight of a first hydraulic binder, said first binder being sulfoalumina clinker or cement, comprising as its main mineral components C$_4$A$_3$S, C$_2$S and C$_4$AF, its primary and secondary components being selected among C$_4$A$_3$S and C$_2$S and
   b) less than or equal to 50% by weight of a sulfate second binder, having more than 70% by weight of anhydrite of soluble form III of formula CaSO$_4$·εH$_2$O, wherein ε is in a range from 0.06 to 0.11, and less than 30% by weight of calcium sulfate hemihydrate of α or β form having a general formula CaSO$_4$ ½H$_2$O.

2. A hydraulic binder produced by the method according to claim 1.

3. A binder according to claim 2, wherein said main mineral component of said first binder is C$_4$A$_3$S.

4. A hydraulic binder according to claim 2, comprising mineral filler additives selected from the group consisting of slag, fly ash, pozzolan, silica soot, limestone fines, lime, industrial by-products and wastes.

5. A method of preparing a hydraulic according to claim 1 wherein in said sulfate second binder the ratio by weight of said hemihydrate to said anhydrite III is less than 15/85.

6. A method according to claim 1, wherein the weight ratio of said sulfate binder to said first binder lies in the range 5/95 to 50/50.

7. A method according to claim 1, wherein the weight ratio of said sulfate binder to said first binder lies in the range 5/95 to 20/80.

8. A hydraulic binder according to claim 2, wherein said first binder, contains:
   15% to 75% by weight of said compound C$_4$A$_3$S.

9. A hydraulic binder according to claim 2, wherein said first binder contains:
   5% to 35% by weight of said compound C$_4$A$_3$S.

10. A hydraulic binder according to claim 2, having a weight ratio of C$_4$A$_3$S to C$_2$S of 1 to 5.

11. A hydraulic binder according to claim 2, comprising:
   a) 15% to 75% by weight of C$_4$A$_3$S; and
   b) 5% to 50% by weight of soluble III anhydrite of calcium sulfate.

* * * * *